(12) United States Patent
Hollenberg

(10) Patent No.: US 6,736,409 B2
(45) Date of Patent: May 18, 2004

(54) DRINKING STRAW PREPARED FROM FLATTENED POLYMERIC TUBULAR CONDUIT, METHOD OF MAKING SAME AND DISPENSER THEREFOR

(75) Inventor: David H. Hollenberg, Kaukauna, WI (US)

(73) Assignee: Fort James Corporation, Atlanta, GA (US)

( * ) Notice: Subject to any disclaimer, the term of this patent is extended or adjusted under 35 U.S.C. 154(b) by 210 days.

(21) Appl. No.: 10/098,843

(22) Filed: Mar. 14, 2002

(65) Prior Publication Data

US 2002/0134850 A1 Sep. 26, 2002

Related U.S. Application Data

(60) Provisional application No. 60/277,718, filed on Mar. 22, 2001.

(51) Int. Cl.[7] .................................................. E03B 9/20
(52) U.S. Cl. ........................ 279/24; 244/150; 244/321; 244/209.3; 425/325
(58) Field of Search ..................... 239/24, 33; 138/118, 138/149; 264/61, 148, 150, 151, 321, 209.3; 425/71, 315, 316, 325, 392

(56) References Cited

U.S. PATENT DOCUMENTS

| | | |
|---|---|---|
| 1,680,341 A | 8/1928 | Rosenthal |
| 3,780,944 A | 12/1973 | Zubalik ........................ 239/33 |
| 4,012,265 A | 3/1977 | Rinde ......................... 106/122 |
| 4,430,451 A | 2/1984 | Young et al. .................. 521/64 |
| 4,473,665 A | 9/1984 | Martini-Vvedensky et al. .. 521/79 |
| 5,034,171 A | 7/1991 | Kiczek et al. ................. 264/51 |
| 5,066,684 A | 11/1991 | LeMay ........................ 521/64 |
| 5,067,629 A | 11/1991 | Schwartz ..................... 221/70 |
| 5,116,883 A | 5/1992 | LeMay ....................... 521/178 |
| 5,128,382 A | 7/1992 | Elliott, Jr. et al. .......... 521/178 |
| 5,158,986 A | 10/1992 | Cha et al. ..................... 521/82 |
| 5,160,674 A | 11/1992 | Colton et al. ................. 264/50 |
| 5,252,620 A | 10/1993 | Elliott, Jr. et al. .......... 521/149 |
| 5,334,356 A | 8/1994 | Baldwin et al. ............. 422/133 |
| 5,847,012 A | 12/1998 | Shalaby et al. ............... 521/61 |
| 5,851,617 A | 12/1998 | Keiser ........................ 428/41.8 |
| 5,854,295 A | 12/1998 | Suh et al. ..................... 521/82 |
| 5,866,053 A | 2/1999 | Park et al. .................... 264/50 |
| 5,889,064 A | 3/1999 | Herrmann ..................... 521/82 |
| 5,898,040 A | 4/1999 | Shalaby et al. ............... 521/61 |
| 5,969,020 A | 10/1999 | Shalaby et al. ............. 524/167 |
| 6,005,013 A | 12/1999 | Suh et al. ..................... 521/79 |
| 6,051,174 A | 4/2000 | Park et al. .................... 264/50 |

*Primary Examiner*—Michael Mar
*Assistant Examiner*—Thach H Bui
(74) *Attorney, Agent, or Firm*—Michael W. Ferrell

(57) ABSTRACT

A drinking straw for consuming a beverage is prepared by: a) melt-extruding a polymeric material in the shape of a continuous tubular conduit suitable for preparing a plurality of drinking straws; b) cooling said continuous tubular conduit to a temperature below the softening point of the polymer; c) flattening the tubular conduit so as to collapse its structure into a substantially planar form, thereby constricting the central longitudinal cavity and reducing the volume of the continuous tubular conduit; d) cutting a length from the continuous conduit of suitable length for making the straw; and e) dilating the length cut from the conduit so as to restore the cross-sectional area of the central cavity and reconstitute the tubular structure of the straw. Advantages of the invention include minimizing storage space and shipping bulk, as well as reducing the need for packaging materials. In further aspects of the invention, there are provided particular processes for making the drinking straw and a drinking straw dispenser.

25 Claims, 3 Drawing Sheets

DRINKING STRAW PREPARED FROM FLATTENED POLYMERIC TUBULAR CONDUIT, METHOD OF MAKING SAME AND DISPENSER THEREFOR

CLAIM FOR PRIORITY

This non-provisional application claims the benefit of the filing date of U.S. Provisional Patent Application Ser. No. 60/277,718, entitled "Drinking Straw Prepared from Flattened Polymeric Tubular Conduit, Method Making Same and Dispenser Thereof", filed Mar. 22, 2001.

TECHNICAL FIELD

The present invention relates generally to flattened drinking straws, methods of making them, and a dispenser therefor which includes means for reconstituting the flattened tube into a tubular straw prior to use.

BACKGROUND

It is known in the art to collapse drinking straws for ease of storage and handling. U.S. Pat. No. 5,067,629 to Schwartz, for example, discloses drinking straws which are packaged by providing a plurality of flexible, hollow, cylindrical tubes arranging the tubes in parallel and pressing the tubes to force them into a substantially flattened configuration. Note FIG. 4 which discloses a drinking straw supply cartridge in accordance with the '629 patent.

U.S. Pat. No. 3,780,944 to Zubalik discloses drinking straws which are compacted for storage and attached to individual beverage containers. The drinking straws are compacted for storage by folding and flattening and attached to a beverage can for example. See FIG. 1 as well as FIG. 10.

U.S. Pat. No. 1,680,341 to Rosenthal relates to a bottle closure which is adapted to contain the straw that is flattened and coiled or otherwise laid upon itself such that the straw occupies little space. See FIGS. 3 and 6 and page 1, lines 103–105.

Collapsible drinking straw systems have not met with substantial commercial success, perhaps due to the fact that prior systems did not utilize suitable materials, or that the prior art systems were simply not convenient enough for widespread acceptance. A further drawback is that conventionally applied materials tend to permanently crease and crack. There is provided in accordance with the present invention a robust system for producing collapsible drinking straws which readily regain their original shape as will be appreciated from the discussion hereinafter.

SUMMARY OF INVENTION

There is provided in accordance with the present invention a drinking straw for consuming a beverage prepared by way of a process including: a) melt-extruding a polymeric material in the shape of a continuous tubular conduit, suitable for preparing a plurality of drinking straws, the conduit being provided with a central longitudinal cavity; b) cooling the continuous tubular conduit to a temperature of below the softening point of the polymer; c) flattening the tubular conduit so as to collapse its structure into a substantially planar form, thereby constricting the central longitudinal cavity and reducing the volume of the continuous tubular conduit; d) cutting a length from the continuous conduit of suitable dimensions for making the straw; and e) dilating the length of the conduit so as to restore the cross sectional area of the central longitudinal cavity thereby reconstituting its tubular structure.

In particular embodiments one may perform the cutting operation prior to dilating the straw back to its original structure; whereas in other embodiments one may prefer to dilate the structure of the straw prior to cutting the length from the continuous conduit. As used herein, the term "continuous" refers to the fact that the conduit is suitable for making a plurality of straws. Typically this would include more than ten straws and up to perhaps several hundred straws or even more. Traditionally, drinking straws have been tubular in nature, that is, having cylindrical tubes with thin walls and relatively large inner openings for conveying fluids. Because of this relatively large inner opening, the packaging, shipping and handling of straws is inherently inefficient in that a majority of the space within a package of straws is empty. The current invention addresses this space issue and also relates to improve efficiencies in the manufacture and dispensing of straws.

Although flattened drinking straws are known, prior art straws were manufactured in a conventional fashion and then flattened subsequent to cutting. The present invention describes a process to produce flattened straws in a continuous fashion whereby the flattened straw is reeled up in coil and then is packaged and shipped to a place of use in a highly compact manner. The coiled straw is then reconstituted and cut to a length in a dispenser that incorporates a means to uncoil, reshape and cut the straw.

In the manufacture of plastic straws, a molten thermoplastic is extruded through a dye to form a continuous tube. This tube is cooled below the softening temperature of the polymer and is then cut to the appropriate length. Typically this is done in a high speed process. The speed of this process is generally limited by the speed of the cutting step. After cutting the straws are either wrapped and packaged or simply packaged for shipment. In the process in the current invention, the straw is formed, extruded, cooled and then put through a slot or pinch roller that partially flattens the straw. The straw, rather than being cut, is rolled up on a reel. Although conventional straws could be put through this flattening process, a solid polymer straw could develop a permanent crease or crack at the fold. The preferred material for the straw in the process of the invention is a straw made from a microcellular foam.

The preferred microcellular foams offer the advantage of reduced weight, increased crack and tear resistance and high resiliency. The microcellular foams are characterized by having a foam cellular structure that has relatively uniform void spaces. Although the actual size of the cells can range from 100 microns down to sub-micron level, with any given foam structure, these cell spaces have a narrow size distribution range. The properties of the foam polymers are influenced not only by the size of the cells, but also the number of cells per unit volume. In general the higher number of cells in a given volume, the lower the density. For straws, the desired cell size is usually in the range of from about 5 to about 70 microns and the desired density is in the range of from about 50 to about 75 percent of the solid polymeric material forming the straw.

The polymers used in the straw making process is suitably any flexible thermoplastic polymer compatible with extrusion to annular die. These polymers include polyethylene, polypropylene, crosslinked or partially crosslinked polyethylene or polypropylene, polyolefins generally, polystyrene, nylon, polyether amides, thermoplastic elastomers, such as styrene-butadiene elastomer copolymers (eg. Kraton®) or styrene-acrylonitrile copolymer elastomers (referred to as polystyrene elastomers herein) polycarbonates, and polycarbonates/acrylonitrile blends or butadiene blends.

Other thermoplastic polymers may be used; however, the least costly polymer will typically be the polymer of choice. Since straws are inherently a disposable item, polypropylene is the material of choice both from a cost standpoint and a performance standpoint.

The current invention is compatible with straws of all common dimensions. Typical straws have a side wall thickness of from about 1/64 to 1/16 inch with inside diameters that range from 1/16 inch up to about 3/8 of an inch. Lengths of straws range from 3 inches up to about 12 inches, but the most common length is 7½ inches to 7¾ inches.

As an example of the space economy associated with the flattened straw of the current invention, a four inch coil (with a one inch core) of straws with 1/64 inch side wall, a ¼ inch outside diameter, and a 7¾ inch length would provide approximately 48 straws and would take up a volume of approximately 4.7 cubic inches. A stack of 48 conventional straws would occupy a volume of 37.75 cubic inches. The coil of straws (even with a one inch core) occupies only 12.5 percent of the volume of the conventional straws. Thus significant economies can be realized by flattening and coiling the straws. The flattened straws would then be reshaped and cut into lengths in the straw dispenser as described here and after.

In particularly preferred embodiments the extruded polymeric material comprises a mixture of a supercritical fluid foaming agent and a polymer. Preferred supercritical fluid foaming agents include high pressure $CO_2$ and high pressure $N_2$. As noted above, the straws are formed from microcellular polymer foams of relatively uniform cell size which may have a foam cell size of from about one micron and up to about 100 microns. Preferred cell sizes for straws are in the range of from about 5 microns to about 70 microns.

The wall density of the straw is typically from about 50 to about 75 percent of the density of the polymer forming the foam matrix in such embodiments. Particularly preferred polymer materials include polyethylene, polypropylene, (polyolefins), polystyrene, nylon, polyetheramides, thermoplastic elastomers, such as Kraton® and polycarbonates, and blends such as blends of polycarbonate/acrylonitrile and butadiene/styrene blends.

In another aspect of the present invention there is provided a method of making a drinking straw for consuming a beverage, wherein the process comprises: a) melt extruding a polymeric foam in the shape of a continuous tubular conduit suitable for preparing a plurality of drinking straws, wherein the conduit is provided with a central longitudinal cavity; b) cooling the tubular conduit to a temperature below the melting point of the polymer; c) flattening the continuous tubular conduit so as to collapse its structure into a substantially planar form, thereby constricting the central longitudinal cavity and reducing the volume of said continuous tubular conduit; d) dilating the length of the conduit so as to restore the cross-sectional area of the central longitudinal cavity thereby reconstituting its tubular shape; and e) cutting a length from the continuous tubular conduit of suitable dimension for making the straw.

In still yet another aspect of the invention there is provided a drinking straw dispenser including a) a continuous polymeric tubular conduit of suitable length for preparing a plurality of drinking straws, the continuous tubular conduit having a central longitudinal cavity; b) reel means for receiving the continuous polymeric tubular conduit wherein the continuous conduit is wound thereabout in substantially planar form such that the central longitudinal cavity of the polymeric tubular conduit is constricted and the volume of the continuous polymeric tubular conduit is thereby minimized; c) means for dilating the continuous tubular conduit as it is unwound from the reel include, for example, a pair of pinch rolls. There is also provided in the drinking straw dispenser (d) means for cutting the straw which could be a heated wire or a razor blade, a clipper or a scissors type cutter or even a relatively high powered laser. In particular embodiments a guillotine type cutter may be employed.

BRIEF DESCRIPTION OF DRAWINGS

The invention is described in detail below with reference to the various drawings wherein the numerals designate similar parts and wherein.

DETAILED DESCRIPTION

Figure 1A:
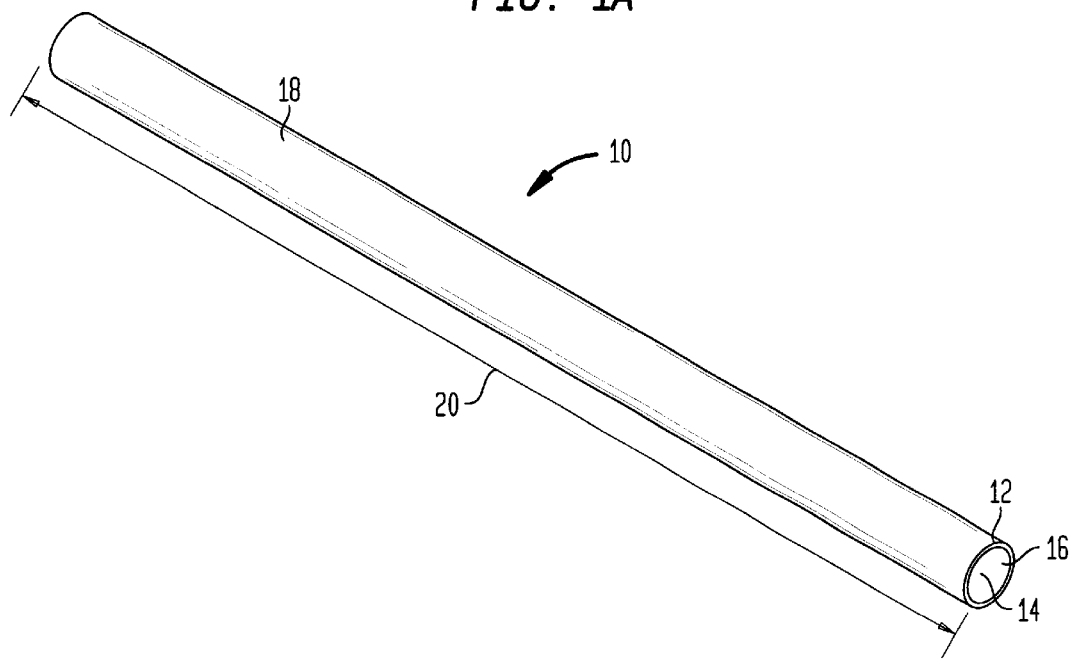
FIG. 1(a) is a view in perspective of a drinking straw prepared in accordance with the present invention in dilated form.

The present invention is described in detail below with reference to the figures and numerous examples. Such description is for purposes of illustration only and is not limitative of the invention which is defined by way of the appended claims. As noted above, the drinking straws of the present invention are preferably formed of microcellular foams. Such materials are known and described, for example, in the following United States patents, the disclosures of which are incorporated herein by reference. Preferred materials may have the characteristics described below and in the various patents referred to.

U.S. Pat. No. 6,051,174 of Park et al. relates to a method of providing continuous processing of microcellular and super microcellular foamed materials. Generally speaking the '174 patent relates to an extrusion system for providing a foam material in which a polymer is supplied to an extruder through a rotating screw chamber. The polymer is placed in a molten state and a foaming agent, such as a supercritical fluid, is introduced into the extruder at a selected pressure so that a two phased mixture of the molten material and the foaming agent is formed. The foaming agent is then diffused into and dissolved in the molten material to form a single phase solution which is forwarded from a solution formation area to a nucleation device. A thermodynamic instability is induced through a rapid pressure drop, e.g. higher than 0.9 GPa/s in the nucleation device to nucleate microcells in the solution. A further shaping device, such as a die, can be used to produce a foamed material of a desired shape. Microcellular plastics are generally defined as foamed plastics characterized by cell sizes on the order of 10 µm, cell densities on the order of $10^9$ cells per cubic centimeter, and specific density reductions in the range of 5–95 percent. In some systems the cell size is on the order of 0.1 to 1.0 micron and cell densities are from $10^{12}$ to $10^{15}$ cells per cubic centimeter of polymer material. See also U.S. Pat. No. 5,866,053 to Park et al.

U.S. Pat. No. 6,005,013 to Suh et al. discloses a microcellular or supermicrocellular polymer extrusion system. The improvement according to the '013 patent includes a nucleation device attached to the extruder which is a gear pump acting as a throttle rather than a pump. By way of this arrangement, the discharge pressure is dictated by die resistance and flow rate as delivered by the gear throttle. The pressure drop of the polymer/gas single-phase solution is nearly instantaneous.

U.S. Pat. No. 5,889,064 to Herrmann discloses a process for making polymer foams. The process includes melting the polymer and mixing it with a foaming agent after which a throttle generates a pressure drop for nucleation of gas bubbles or cells. The mixture is then shaped, foamed and cooled. In order to produce high grade foam polymer with a microcellular or sub-microcellular structure continuously without any shaping limitations, the throttle controlling the flow rate has a passage control so that the flow rate can be adjusted independently of the pressure drop.

U.S. Pat. No. 5,851,617 to Keiser discloses microcellular foam material and articles made there from. The cell density of the microcellular foam material lies in the range of from about $10^9$ to about $10^{15}$ cells per cubic centimeter and the average size of the cells is less than about 10 microns.

U.S. Pat. No. 5,334,356 to Baldwin et al. discloses a supermicrocellular foam material and a method for producing the material. The polymer to be foamed is a plastic material, having a supercritical fluid such as supercritical carbon dioxide in its supercritical state introduced into the plastic to form a foam fluid/material system having a plurality of cells distributed substantially throughout the material. Cell densities lying in the range of from about $10^9$ to about $10^{15}$ per cubic centimeter of the material can be achieved with average cell sizes being less than about 2 microns and preferably in the range of from about 0.1 micron to about 1.0 micron. Particular plastics disclosed in the '356 patent include PETG, low density polyethylene, high density polyethylene, and polycarbonate.

U.S. Pat. No. 5,252,620 to Elliott, Jr. et al. discloses organic microcellular foams prepared by polymerizing directly in a near critical fluid and pursuing the supercritical drying in the same reactor. The critical variables are the choice of a diluent with a strong enough solvent power to stabilize the polymer matrix, but with a low enough critical temperature to permit critical point drying without damage to the polymer matrix. See also, U.S. Pat. No. 5,128,382.

U.S. Pat. No. 5,160,674 to Colton et al. discloses a method for producing a microcellular foam from a semicrystalline polymeric material. The material is heated to its melting point at an elevated pressure and then saturated with a uniform concentration of a gas. The pressure is then lowered causing bubble nucleation and growth within the material. The material is then quenched to prevent further foaming. Bubbles on the order of 5 microns in diameter are produced with a bubble density of approximately $10^{10}$ bubbles/cm$^3$. Specifically disclosed are foamed materials made with polypropylene/ethylene copolymer and polypropylene.

U.S. Pat. No. 5,158,986 to Cha et al. discloses a supermicrocellular foam material and method for producing it. The material to be foamed has a supercritical fluid, such as carbon dioxide in its supercritical state introduced into the plastic to form a foamed fluid/polymer system having a plurality of cells distributed throughout the material. Cell densities lie in the range of from about $10^9$ to about $10^{15}$ per cubic centimeter of the material can be achieved with the average cell sizes less than about 2 microns and preferably in the range of from about 0.1 micron to about 1 micron. Typical processing conditions include a temperature of about 40° C. and pressures of from about 1500 psi to about 3000 psi.

U.S. Pat. No. 5,034,171 to Kiczek et al. discloses process for making microcellular foamed articles wherein a low pressure compressible, inert gas such as nitrogen is used as a foaming agent. The process includes introducing a thermoplastic material into an extruder forming a homogeneous dispersion of insoluble bubbles within the material and reducing the pressure of the molten thermoplastic material causing the dispersed bubbles to expand to form a foamed article.

U.S. Pat. No. 4,473,665 to Martini-Vvedensky et al. discloses microcellular foam material having void fractions of about 5 to 30 percent and uniform void sizes on the order of 2–25 microns. The foam materials are produced by pre-saturating the material to be processed with a uniform concentration of a gas while controlling temperature and pressure to avoid cell nucleation. After processing, pressure is released and the cell nucleation occurs at or near the glass transition temperature of the material. It is then cooled to preserve the microcellular structure. Specifically disclosed are foams of polystyrene produced by way of using a nitrogen gas. See also U.S. Pat. No. 4,430,451 to Young et al. and U.S. Pat. No. 4,012,265 to Rinde.

Figure 3A:
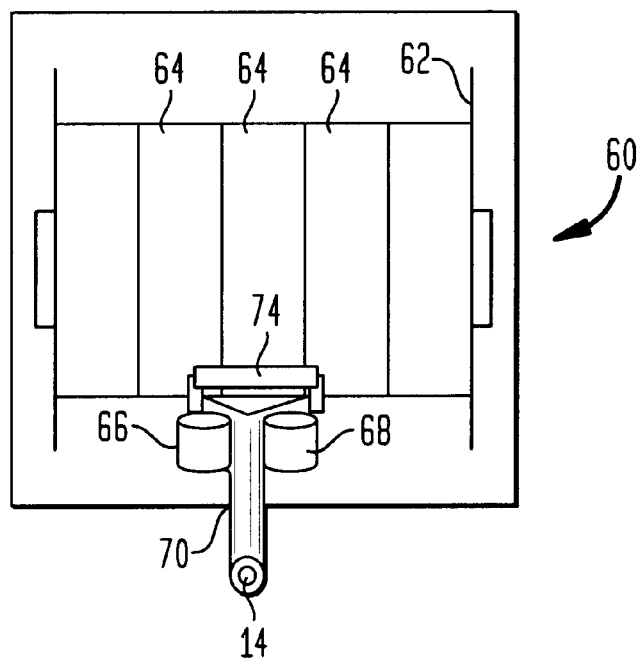
FIG. 3(a) is a top schematic and perspective of a dispenser for the straws of the invention.
Figure 3B:
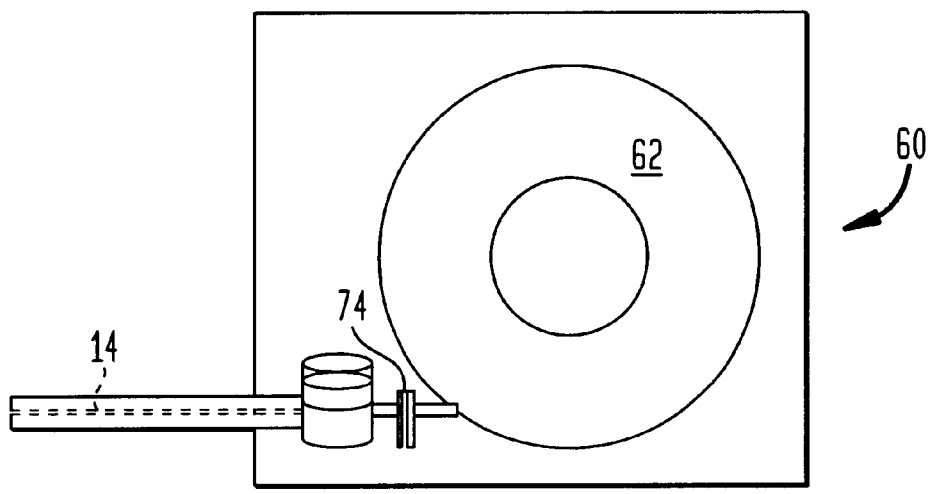
FIG. 3(b) is a side schematic and perspective view of the dispenser of FIG. 3(a).

The invention is better understood by reference to FIGS. 1(a) through 1(c), FIG. 2, as well as FIGS. 3(a) and 3(b).

There is shown in FIG. 1(a) a drinking straw 10 including a side wall 12 as well as a central longitudinal cavity 14. Cavity 14 extends from one end 16 of the straw to the other end of the drinking straw 18. Typically, as noted above, a drinking straw would have a length 20 extending from end 16 to end 18 of about 7½ inches.

Figure 1B:
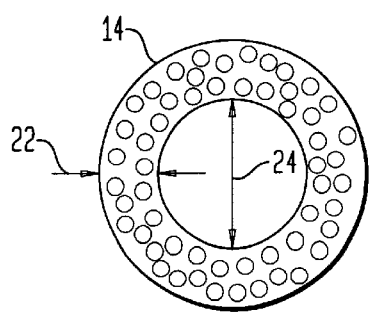
FIG. 1(b) is an enlarged end view of the straw of FIG. 1(a)

The drinking straw with its foam structure is more clearly illustrated in FIG. 1(b) which is an enlarged end view of drinking straw 10. As can be seen from FIG. 1(b) sidewall 14 is preferably of a foamed structure having a wall thickness 22 of from about ¹⁄₆₄ to about ¹⁄₁₆ of an inch. Likewise the inside diameter 24 of the straw is typically of from about ¹⁄₁₆ to ⅜ of an inch. The foam density is such that the straw is formed of a material having a density typically of from about 50 percent to about 75 percent of the polymer forming the matrix of the foam.

Figure 1C:
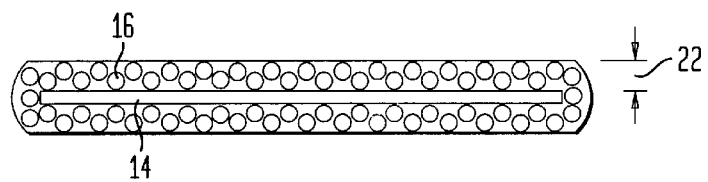
FIG. 1(c) is an enlarged end view of the straw as in FIG. 1(b) in collapsed form.
Figure 2:
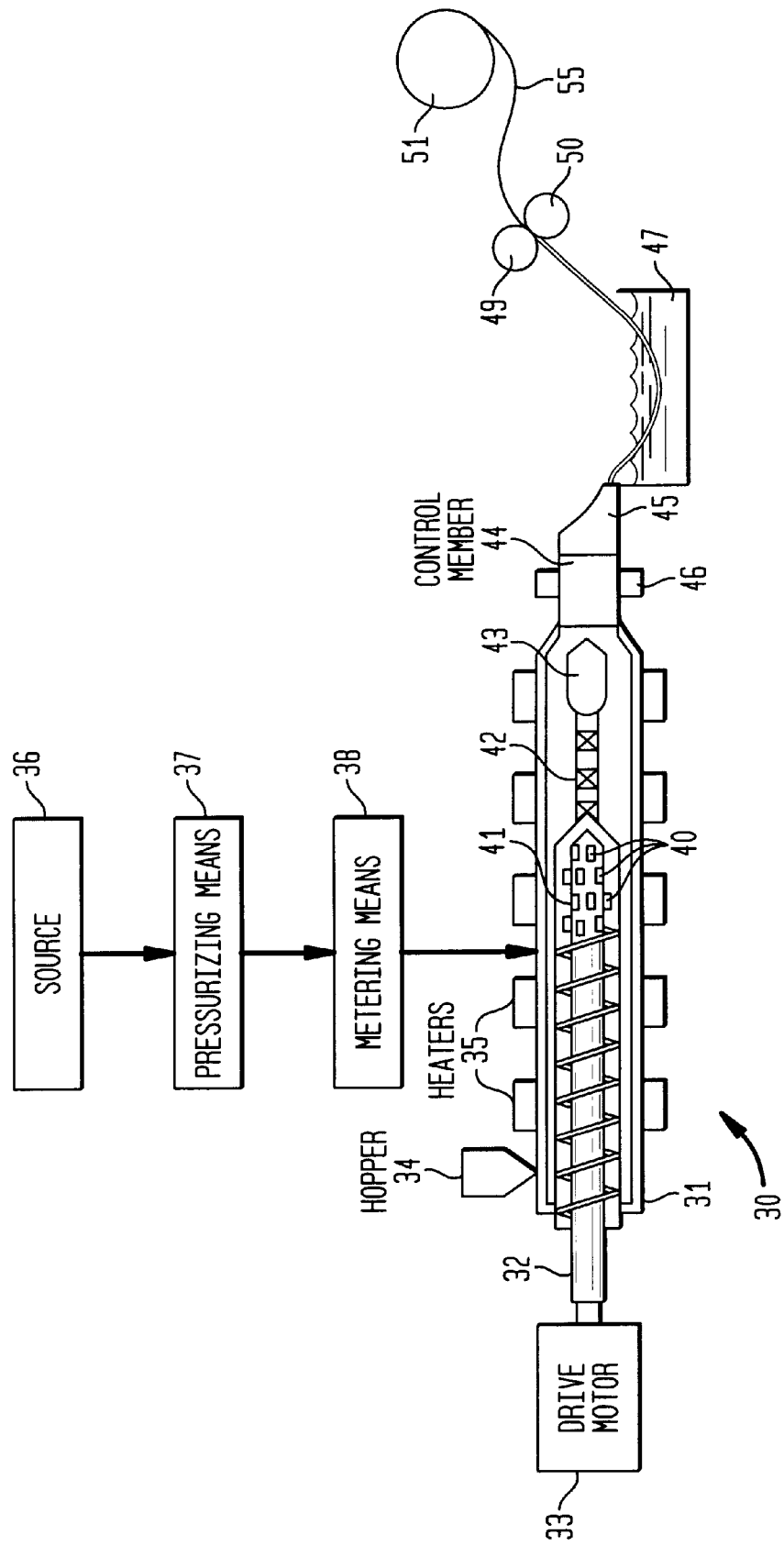
FIG. 2 is a schematic diagram of an apparatus useful for making tubular conduit for the straws of the present invention.

FIG. 1(c) is an enlarged view of a collapsed drinking straw in accordance with the invention. As will be appreciated from FIG. 1(c), central conduit 14 is severely constricted such that the volume of the conduit is greatly reduced. In fact in the collapsed state as will be further appreciated from FIG. 2, the volume of central longitudinal cavity 14 is negligible.

A suitable material is microcellular polypropylene which can be extruded as described in U.S. Pat. No. 6,051,174 with reference to FIG. 2 hereof.

As seen therein, an extruder 30 includes an extruder barrel 31 having a rotating screw member 32 suitably mounted therein, the rotation thereof being produced by an appropriate drive motor 33. A plurality of pellets of a material to be foamed, e.g. a polymer plastic material, are introduced into the extruder barrel 31 via a hopper 34. Extruder barrel 31 has a plurality of barrel heaters 35 mounted thereon to heat the barrel. Hence, the polymer pellets are heated therein to a molten state both by friction due to the mechanical shear forces on the material produced by the rotating screw member 32 and by the heated barrel as the pellets are carried through the barrel by screw member 32.

A supercritical fluid, such as $CO_2$ from a source 36 thereof is pressurized to a selected pressure, by a suitable pressurizing means, 37, and a metered amount thereof is supplied at a controlled rate via a metering means 38 to the extruder barrel 31. This results in the formation of a suitable two-phase mixture, at a high pressure, which mixture is formed in the polymer melt within the extruder barrel 31. The location of the supercritical fluid injection can be suitable minimum, but relatively high, pressure can be maintained throughout the remaining stages of the process.

In the particular embodiment described, the two-phase mixture of supercritical fluid and polymer material that results is then further mixed by shear forces thereon using a plurality of irregular blades 40 mounted on a portion 41 of extruder screw 32 within extrusion barrel 31. Alternatively, in some applications, the mixing process which occurs when using a standard extrusion screw can be sufficient to provide the desired mixture without the need for the irregular blades 40. The dynamically mixed mixture is then supplied to a plurality of static mixers 42 where the mixture is further mixed and the supercritical fluid diffuses and dissolves into the polymer material so as to form a single-phase solution thereof. In some embodiments, passage of the mixture through a barrel which does not use the static mixers can provide sufficient diffusion and dissolution to form the desired single-phase solution. The single-phase solution is supplied via an extruder output member 43 to a pressure control member 44 at a selected temperature which is maintained by appropriate temperature control elements 46. The pressure drops rapidly in the pressure control member 44 to produce both supermicrocellular nucleation and a full or limited expansion of said nucleated supermicrocells to continuously provide a nucleated solution. An annular shaping die 45 is employed to provide the tubular structure required for the inventive drinking straws. After the continuous tube 55 is cooled below its softening point, it is passed through a water bath 47 in order to be cooled to a temperature below its softening point and thereafter it is collapsed by a pair of pinch rolls 49, 50 before being wound up on a reel, 51.

There is shown in FIGS. 3(a) and 3(b), in still yet another embodiment of the invention a dispenser 60 which includes a reel 62 mounted therein carrying a continuous polymeric tube 64 in collapsed form thereabout. The continuous tube is drawn off of reel 62 (ie. in flat form) through a pair of pinch rollers 66, 68 which operate on collapsed tube 64 to reconstitute its tubular shape 70 as it is drawn from the dispenser. As can be seen in FIG. 3(a), particularly the central cavity 14 is restored to its open cross-sectional configuration. There is further provided in connection with dispenser 60 a guillotine 74 which may be used to cut the tube to the desired length.

While the invention has been described in detail with reference to numerous embodiments and particular aspects, numerous modifications within the spirit and scope of the present invention will be readily apparent to those of skill in the art. The invention is defined in the appended claims.

What is claimed is:

1. A drinking straw for consuming a beverage prepared by way of a process comprising:
   a) melt-extruding a polymeric material in the shape of a continuous tubular conduit suitable for preparing a plurality of drinking straws, said conduit being provided with a central longitudinal cavity;
   b) cooling said continuous tubular conduit to a temperature below the softening point of the polymer;
   c) flattening said tubular conduit so as to collapse its structure into a substantially planar form, thereby constricting said central longitudinal cavity and reducing the volume of said continuous tubular conduit;
   d) cutting a length from said continuous tubular conduit of suitable dimensions for making said straws; and
   e) dilating said length of said continuous conduit so as to restore the cross sectional area of said central longitudinal cavity, thereby reconstituting its tubular structure.

2. The drinking straw according to claim 1, wherein said step of dilating said length of said continuous tubular conduit is carried out prior to cutting said length from said continuous tubular conduit.

3. The drinking straw according to claim 1, wherein said step of cutting said length from said continuous tubular conduit is carried out prior to dilating said length of said continuous tubular conduit to restore the cross sectional area of the central longitudinal cavity.

4. The drinking straw according to claim 1, wherein said polymeric material comprises a mixture of a supercritical fluid foaming agent and a polymer.

5. The drinking straw according to claim 4, wherein said supercritical fluid foaming agent is $CO_2$.

6. The drinking straw according to claim 4, wherein said supercritical fluid foaming agent is $N_2$.

7. The drinking straw according to claim 1, wherein said straw is formed of a microcellular polymer foam having a foam cell size of from about less than about 1 micron up to about 100 microns.

8. The drinking straw according to claim 7, wherein said straw is formed from a microcellular polymer foam having a foam cell size of from about 5 to about 70 microns.

9. The drinking straw according to claim 7, wherein said drinking straw has a wall density of from about 50 percent to about 75 percent of the density of the polymer forming the foam matrix.

10. The drinking straw according to claim 1, wherein said polymeric material comprises a polyolefin polymer, a polystyrene polymer, or a polystyrene elastomer.

11. The drinking straw according to claim 1, wherein the sidewall of said drinking straw has a thickness of from about 1/64 inch to about 1/16 inch.

12. The drinking straw according to claim 11, wherein the central cavity of said drinking straw has an inside diameter of from about 1/16 inch to about 3/8 inch.

13. The drinking straw according to claim 12, wherein said drinking straw has a length of from about 3 inches to about 12 inches.

14. A method of making a drinking straw for consuming a beverage, said process comprising:
   a) melt-extruding a polymeric foam in the shape of a continuous tubular conduit suitable for preparing a plurality of drinking straws, said conduit being provided with a central longitudinal cavity of open cross section;
   b) cooling said tubular conduit to a temperature below the softening point of the polymer foam material;
   c) flattening said tubular conduit so as to collapse its structure into a substantially planar form, thereby constricting said central longitudinal cavity and reducing the volume of said continuous tubular conduit;
   d) cutting a length from said continuous tubular conduit of suitable dimensions for making said straw; and
   e) dilating said length of said conduit so as to restore the cross sectional area of said central longitudinal cavity thereby reconstituting the tubular structure.

15. The method according to claim 14, wherein said polymeric foam is produced from a mixture comprising a polymer and a supercritical fluid foaming agent.

16. The method according to claim 15, wherein said supercritical fluid foaming agent is $CO_2$.

17. The method according to claim 15, wherein said supercritical fluid foaming agent is $N_2$.

18. The method according to claim 14, wherein said drinking straw is formed from a microcellular polymer foam having a foam cell size of from about 1 micron up to a foam cell size of about 100 microns.

19. The method according to claim 18, wherein said drinking straw is formed of a microcellular polymer foam having a foam cell size of from about 5 to about 70 microns.

20. The method according to claim 14, wherein the wall density of the straw is from about 50 to about 75 percent of the density of the polymer forming the foam matrix.

21. The method according to claim 14, wherein said polymeric foam material comprises a polymer selected from the group consisting of polyolefins, polystyrene, and polystyrene elastomer.

22. A drinking straw dispenser comprising:
   a) a continuous polymeric tubular conduit of suitable length for preparing a plurality of drinking straws, said continuous tubular conduit defining a central longitudinal cavity thereof;
   b) reel means positioned, configured, and dimensioned to receive said continuous polymeric tubular conduit, wherein said continuous polymeric tubular conduit is wound about said reel means in substantially planar form such that said central longitudinal cavity of said continuous polymeric tubular conduit is constricted and the volume of said continuous polymeric tubular conduit is thereby minimized;
   c) means for dilating said continuous polymeric tubular conduit configured to restore the tubular form of said continuous polymeric tubular conduit as it is unwound from said reel; and
   d) means for cutting said continuous polymeric tubular conduit into a length suitable for a drinking straw.

23. The drinking straw dispenser according to claim 22, wherein said continuous polymeric tubular conduit is formed from a microcellular polymer foam having a foam cell size of from about 5 to about 70 microns.

24. The drinking straw dispenser according to claim 22, wherein said polymer foam comprises a polymer selected from the group consisting of polyolefins, polystyrene, and polystyrene elastomer.

25. The drinking straw dispenser according to claim 22, wherein said means for dilating said continuous polymeric tubular conduit comprise a pair of pinch rolls.

* * * * *

UNITED STATES PATENT AND TRADEMARK OFFICE
CERTIFICATE OF CORRECTION

PATENT NO. : 6,736,409 B2
DATED : May 18, 2004
INVENTOR(S) : Hollenberg

It is certified that error appears in the above-identified patent and that said Letters Patent is hereby corrected as shown below:

Column 1,
Line 10, insert -- Of -- after "Method";

Column 2,
Line 16, change "improve" to -- improved --;
Line 58, change "is" to -- are --;
Line 66, insert -- , -- after "herein)";

Column 3,
Line 25, change "here and after" to -- hereinafter --;
Line 38, change "(polyolefins)" to -- polyolefins --;
Line 60, insert -- : -- after "including";

Column 5,
Line 21, change "there from" to -- therefrom --;

Column 6,
Line 6, insert -- a -- after "discloses"; and

Column 7,
Line 45, change 'ie." to -- i.e. --.

Signed and Sealed this

Ninth Day of November, 2004

JON W. DUDAS
*Director of the United States Patent and Trademark Office*